United States Patent [19]

Sturman et al.

[11] Patent Number: 4,857,842
[45] Date of Patent: Aug. 15, 1989

[54] TEMPERATURE COMPENSATED HALL EFFECT POSITION SENSOR

[75] Inventors: Oded E. Sturman; Benjamin Grill, both of Northridge; Lynn Harrison, Newhall, all of Calif.

[73] Assignee: Kineret Engineering, Northride, Calif.

[21] Appl. No.: 57,507

[22] Filed: Jun. 3, 1987

[51] Int. Cl.$^4$ .................. G01B 7/14; G01R 33/06; H01L 43/06
[52] U.S. Cl. .................. 324/225; 324/207; 324/251; 307/309; 338/32 H
[58] Field of Search .............. 324/207, 208, 225, 251, 324/174; 307/309; 338/32 H

[56] References Cited

U.S. PATENT DOCUMENTS 3,460,033  8/1969  Weir et al. ........................ 324/174
4,349,814  9/1982  Akehurst .......................... 324/251

FOREIGN PATENT DOCUMENTS 55-125688  9/1980  Japan ............................. 338/32 H Primary Examiner—Reinhard J. Eisenzopf
Assistant Examiner—Walter E. Snow
Attorney, Agent, or Firm—Blakely, Sokoloff, Taylor & Zafman

[57] ABSTRACT

A temperature compensated position sensor which may be used with hydraulic and pneumatic actuators having a magnetic piston and a non-magnetic cylinder is disclosed. The position sensor comprises a pair of Hall effect sensors mounted adjacent a permanent magnet on the outside of a hydraulic cylinder. One Hall effect sensor is oriented upside down with respect to the second Hall effect sensor such that the two Hall effects sensors perceive equal and opposite magnetic fields. The voltage outputs of both Hall effect sensors are amplified, and one is inverted. The resultant voltage signals are added together. Because changes in temperature produce equal changes in the output voltage of each sensor, the summing process cancels out temperature induced variations in the voltage signals. The resultant sum is dependent only on the magnitude of the magnetic field perceived by the Hall effect sensors, regardless of the variation in temperature. As the piston approaches the position sensor, the magnetic field at the Hall effect sensors rises due to the magnetic piston material forming a flux path between the magnet and the Hall effect sensors. The arrival of the piston at the piston sensor location can therefore be accurately determined from the summed output of the two Hall effect sensors. In one embodiment of the invention, the permanent magnet and Hall effect sensors are contained in a sensor package easily clamped to cylinders of substantially any size.

20 Claims, 5 Drawing Sheets

TEMPERATURE COMPENSATED HALL EFFECT POSITION SENSOR

BACKGROUND OF THE INVENTION

1. Field of the Invention

The present invention relates to the field of position sensors, and more specifically to a temperature compensated Hall effect actuator piston position sensor.

2. Prior Art

In certain applications it is required or at least desirable to know the position of a part without touching the part, such as the piston in a hydraulic or pneumatic actuator. By way of example, some sequential machines are designed so that the initiation of a particular operation or motion is dependent upon an appropriate signal indicating the completion of the preceding motion or operation. In other instances, it is desirable to know when the actuator is reaching the limit of its stroke for various control purposes. In robots and other systems operating under computer control, pneumatic and hydraulic actuators provide no specific feedback of position, and accordingly a degree of freedom may be suddenly lost if a limit signal is not somehow generated and provided to the computer to provide a warning of such fact. The same is not required, of course, of stepper motors and the like, as a computer may readily keep tract of all the positive and negative steps to know at all times where the stepper motor is, though similar measurements of air or hydraulic fluid flow cannot be made with sufficient accuracy to provide similar information for such actuators.

Various types of piston position sensing devices are well known in the prior art. By way of example, U.S. Pat. No. 4,176,586 discloses a system which utilizes a limit switch formed with a switch blade of ferromagnetic material located outside of the cylinder to sense the position of a piston having an annular rim constituted of permanent magnetic material. Such a system requires a special piston, as conventional actuators do not utilize permanent magnetic material pistons. A sensor in accordance with this patent would also exhibit very high hysteresis, as the motion of the switch blade will itself introduce a high degree of hysteresis. As an alternative, U.S. Pat. No. 4,071,725 discloses a proximity switch which uses a permanent magnet on the moving member of the switch external to the cylinder to respond to the presence of the magnet piston therein. In that regard, cylinders frequently utilize a steel piston and accordingly, at least this sensor would be operative with conventional actuators without requiring a special piston therein. However, this type of sensor would also exhibit very high hysteresis, primarily because of the motion of the magnet.

U.S. Pat. No. 3,364,361 discloses a piston controlled impulse generating arrangement for clamping around the cylinder of an actuator which uses a pair of windings on an iron core. One winding is connected to a source of alternating current, with a voltage induced in the second winding being indicative of the presence of the piston at that position. Alternatively, a Hall generator may be used. Such a system should have the advantage of a lower hysteresis than other prior art sensors, as the piston is the only moving part, and use of the AC current will generate an alternating field which should minimize magnetic hysteresis. However, an alternating magnetic field will not easily pass through a conductor such as an aluminum cylinder, with the eddy currents induced in the aluminum causing high stray magnetic fields and grossly limiting signal strengths. Accordingly, it is not clear that useful signals can be achieved, particularly for larger cylinders and/or thicker cylinder walls.

A final prior art device uses an externally mounted Hall effect sensor to sense the presence of a magnetic field generated by a magnetic ring attached to the piston. Again, such a system requires a special piston. In addition, because the output of a Hall effect sensor is temperature dependent, accurate sensing of the piston position can only be obtained over a very narrow temperature range.

BRIEF SUMMARY OF THE INVENTION

A temperature compensated position sensor which may be used with hydraulic and pneumatic actuators having a magnetic piston and a non-magnetic cylinder is disclosed. The position sensor comprises a pair of Hall effect sensors mounted adjacent a permanent magnet on the outside of a hydraulic cylinder. One Hall effect sensor is oriented upside down with respect to the second Hall effect sensor such that the two Hall effects sensors perceive equal and opposite magnetic fields. The voltage outputs of both Hall effect sensors are amplified, and one is inverted. The resultant voltage signals are added together. Because changes in temperature produce equal changes in the output voltage of each sensor, the summing process cancels out temperature induced variations in the voltage signals. The resultant sum is dependent only on the magnitude of the magnetic field perceived by the Hall effect sensors, regardless of the variation in temperature. As the piston approaches the position sensor, the magnetic field t the Hall effect sensors rises due to the magnetic piston material forming a flux path between the magnet and the Hall effect sensors. The arrival of the piston at the piston sensor location can therefore be accurately determined from the summed output of the two Hall effect sensors. In one embodiment of the invention, the permanent magnet and Hall effect sensors are contained in a sensor package easily clamped to cylinders of substantially any size.

DETAILED DESCRIPTION OF THE INVENTION

An improved Hall effect position sensor is disclosed. In the following description, for purposes of explanation, numerous details are set forth, such as specific materials, arrangements and proportions in order to provide a thorough understanding of the present invention. However, it will be apparent to one skilled in the art that the invention may be practiced without these specific details. In other instances, well known articles such as Hall effect sensors, hydraulic pistons, and electronic components such as integrated circuit amplifiers and comparators have not been described in detail in order not to obscure the present invention unnecessarily.

Figure 1:
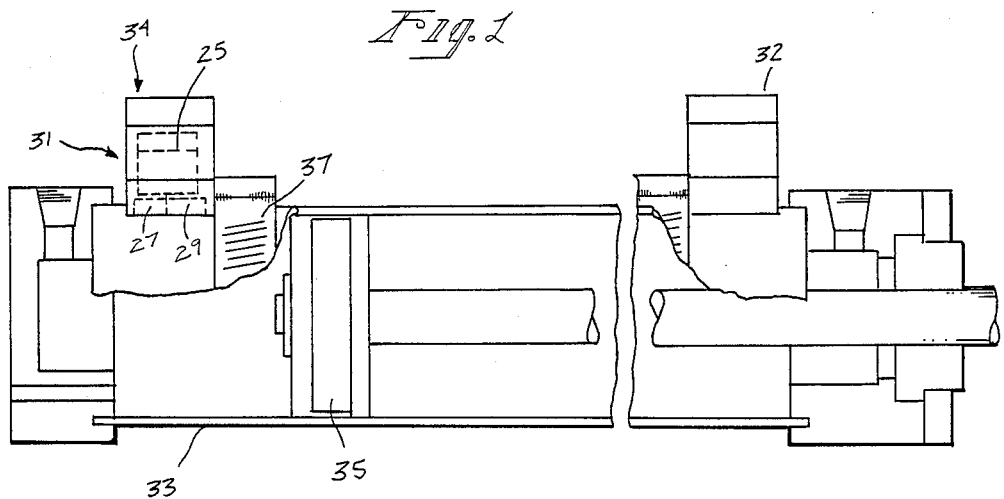
FIG. 1 is a side, cut away view of a typical hydraulic piston and cylinder illustrating the placement of the sensors of the present invention.
Figure 2:
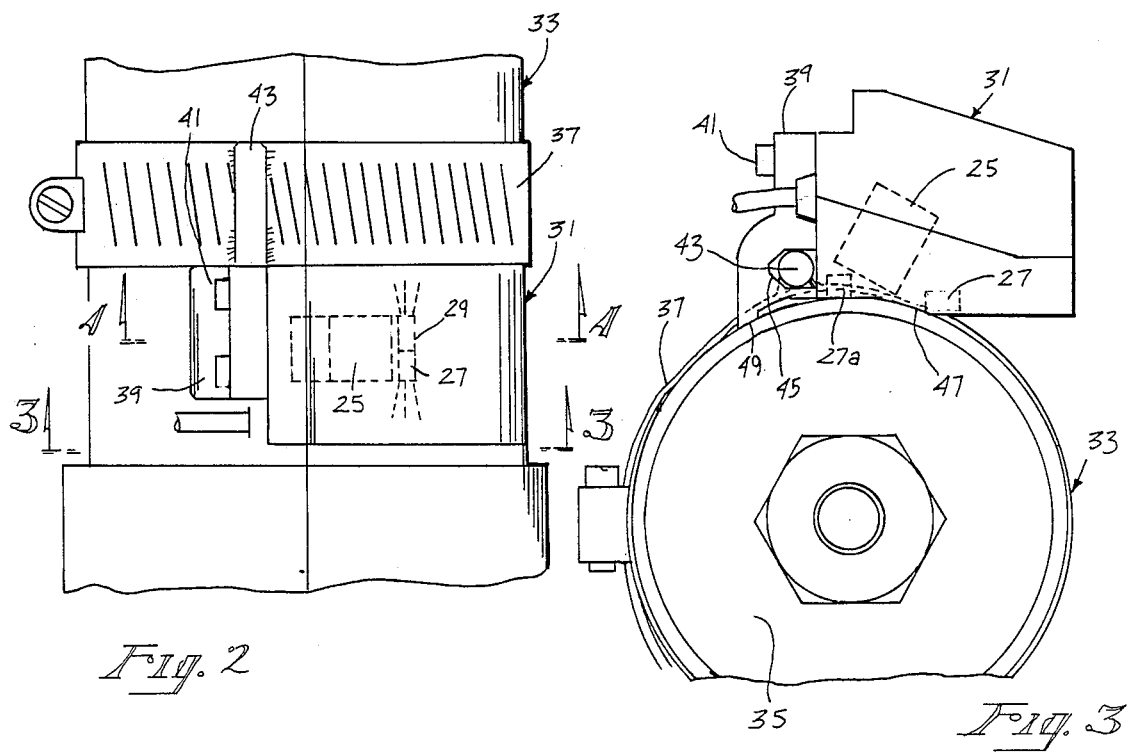
FIG. 2 is an enlarged, top view of one of the sensors of FIG. 1.
Figure 3:
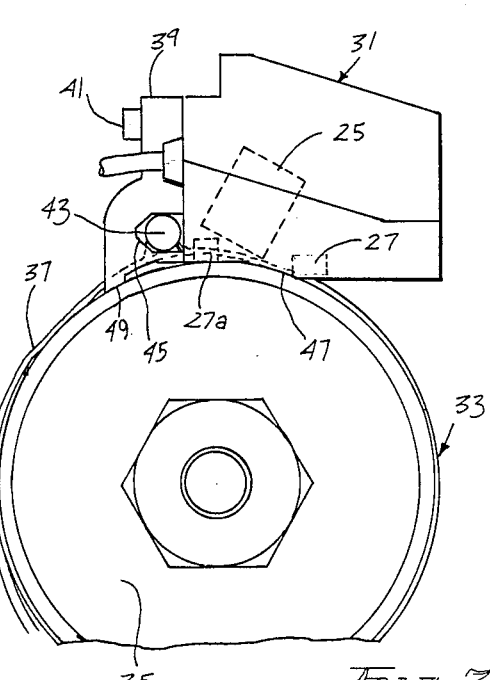
FIG. 3 is a front view of the sensor of FIG. 2.
Figure 4:
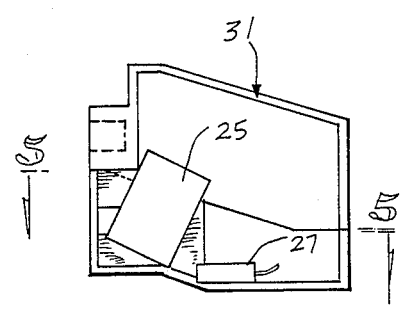
FIG. 4 is a sectional view of the sensor of FIG. 3.
Figure 5:
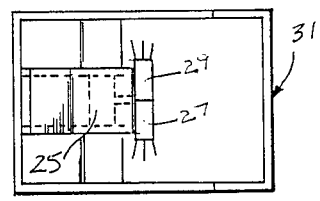
FIG. 5 is a top sectional view of the sensor of FIG. 4.

The present invention uses Hall effect sensors in conjunction with a permanent magnet to sense the arrival of a ferromagnetic piston traveling within a hydraulic or pneumatic cylinder at a predetermined position. A Hall effect sensor of the kind used in the present invention is a commercially available solid state device which produces an output signal whose voltage depends on the strength and direction of the magnetic field in which the Hall effect sensor is located. As shown in FIGS. 1 through 5, sensor 34 comprises a permanent magnet 25 and at least one Hall effect sensor 27 mounted in an enclosure 31 which is attached to the outside of a hydraulic or pneumatic cylinder 33. Such a cylinder is commonly made of a non-ferromagnetic material such as aluminum. A piston 35 made of a ferromagnetic material such as iron or steel reciprocates inside of cylinder 33. As shown more clearly in FIG. 3, Hall effect sensor 27 may be located underneath permanent magnet 25 as indicated by item 27A, but is preferably located next to permanent magnet 25 a indicated by item 27. The location indicated by item 27 in FIG. 3 is preferred because it experiences a greater relative change in magnetic field strength by the arrival of piston 35. When piston 35 is at a position within cylinder 33 remote from position sensor 31, the Hall effect sensor 27 is exposed to a relatively weak magnetic field produced by permanent magnet 25. The magnetic field is relatively weak because the flux path of the magnetic field produced by the magnet passes primarily through air, which has a relatively high reluctance. As the piston 35 approaches the sensor position, the magnetic field in the proximity of Hall effect sensor 27 begins to increase, because the ferromagnetic material of the piston begins to form part of the magnetic circuit. The overall reluctance of the magnetic circuit is thereby reduced, causing an increase in the strength of the magnetic field. The strength of the magnetic field continues to rise until the piston reaches its point of closest approach to permanent magnet 25. As long as the piston does not proceed beyond its point of closest approach with permanent magnet 25, the relative position of the piston with respect to the location of sensor 34, when the piston is near enough to sensor 34 to influence the magnetic field, can be determined from the output voltage produced by the Hall effect sensor. As long as the sensor is operated at a relatively constant temperature, the position of the piston 35 can be accurately sensed to within a few thousandths of an inch with a high degree of repeatability. As shown in FIG. 1, additional sensors 32 may be also placed at other positions along the cylinder to sense the arrival of the piston at those other locations.

Figure 7:
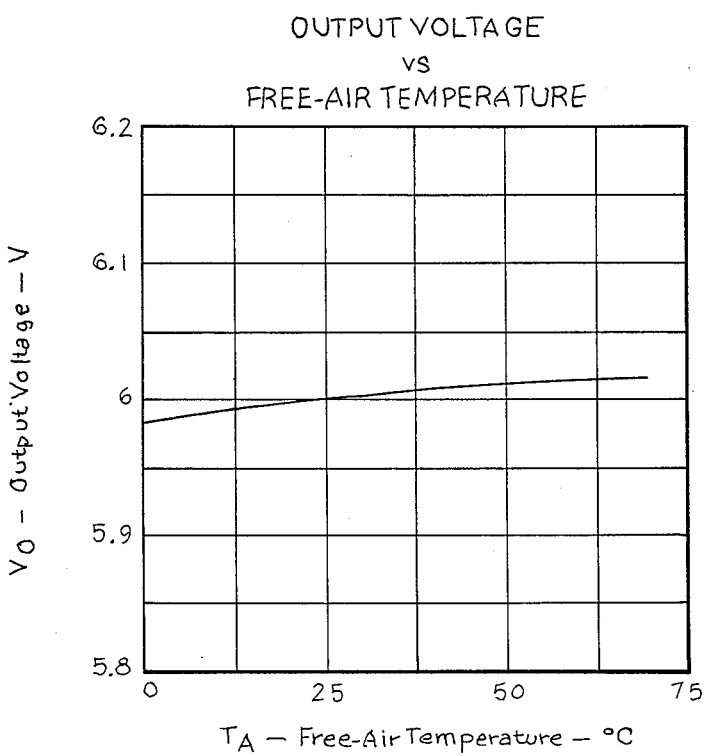
FIG. 7 is a graph illustrating the output voltage as a function of the temperature of the Hall effect sensor of FIG. 6.

When sensor 34 is exposed to an operating environment exhibiting wide variations in temperature, however, the accuracy with which the position of the piston can be sensed is reduced, because the voltage output of the Hall effect sensor 27 is sensitive to temperature. This temperature dependence of the output voltage of a typical Hall effect sensor is shown in FIG. 7.

Figure 10:
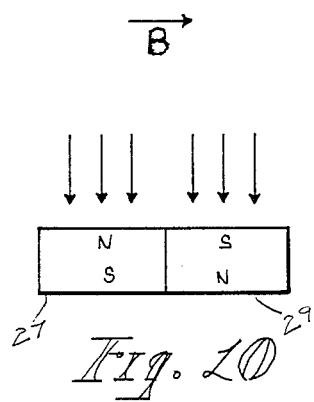
FIG. 10 is a schematic view illustrating one embodiment of the arrangement of the Hall effect sensors of the present invention.

In the preferred embodiment of the present invention, temperature effects are overcome by mounting two Hall effect sensors 27 and 29 adjacent to each other as illustrated in FIGS. 1 through 5. Hall effect sensor 29 is flipped 180 degrees with respect to Hall effect sensor 27 such that the relative field to which it is exposed is equal and opposite to the field sensed by Hall effect sensor 27, as illustrated in FIG. 10. For the direction of magnetic field B shown in FIG. 10 and the orientation of Hall effect sensors 27 and 29 illustrated, sensor 27 will sense a field of magnitude B, while sensor 29 will sense a field of magnitude $-B$. As explained in greater detail below, if the voltage signal produced by Hall effect sensor 29 is inverted and added to the voltage produced by Hall effect sensor 27, the resultant sum will not be influenced by changes in temperature but will depend solely on the strength of the magnetic field.

Figure 6:
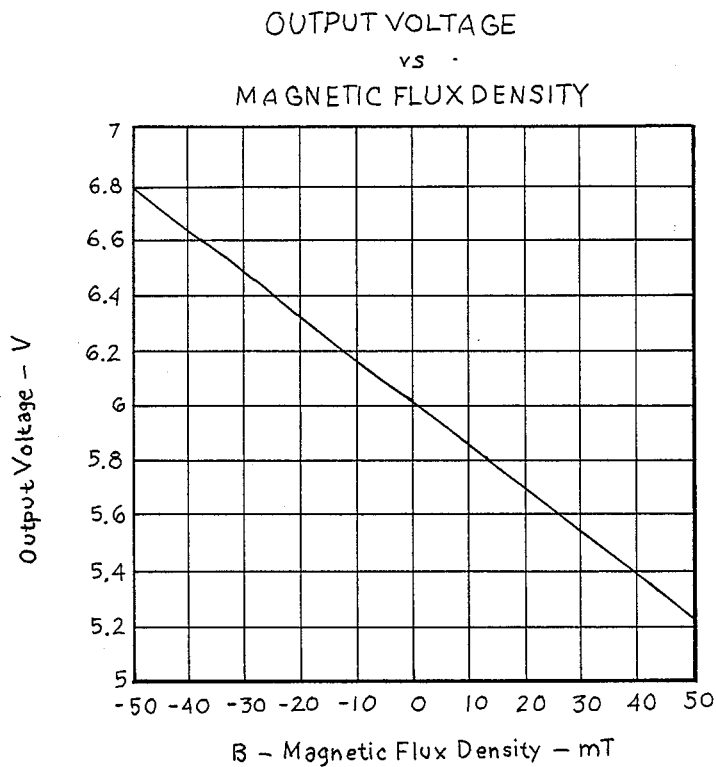
FIG. 6 is a graph illustrating the relationship between the output voltage as a function of the magnetic flux density for a typical Hall effect sensor.

The temperature compensating effect of the preferred embodiment of the present invention can best be described with reference to FIGS. 6 and 7. FIG. 6 illustrates the relationship between the output voltage and magnetic field flux density for a typical Hall effect sensor. As can be seen, for the Hall effect sensor shown, the output voltage ranges between 6.8 volts for a magnetic flux density of $-50$ mT to a voltage of 5.2 volts for a magnetic flux density of 50 mT. The Hall effect sensor illustrated has a nominal voltage output of 6.0 volts in the absence of any magnetic field. As shown in FIG. 7 this output voltage increases with increasing temperature.

If only one Hall effect sensor is used, the output voltage V at a temperature T for a magnetic field strength B will increase by an amount dV for an increase in temperature dT. For a temperature range between 0 degrees C. and 75 degrees C., this variation in output voltage can typically be on the order of plus or minus 5%, causing a resulting inaccuracy in the sensing of the piston position.

The novel arrangement of the two Hall effect sensors in the preferred embodiment of the present invention, however, cancels such temperature variation effects. Assume that $V_1$ and $V_2$ are equal to the voltage outputs of Hall effect sensors 27 and 29, respectively, at temperature T and magnetic field strength B. It will be recalled that because Hall effect sensors 27 and 29 are oriented upside down with respect to each other, they sense equal and opposite relative magnetic fields. Thus, Hall effect sensor 27 senses a magnetic field of magnitude $+B$, while Hall effect sensor 29 senses a magnetic field of $-B$. From FIG. 6, it can be seen that $V_2$ is therefore greater than $V_1$. $(V_2-V_1)$ will therefore be a positive number. It can also be seen that as the magnitude B of the magnetic field increases, $V_2$ becomes larger while $V_1$ becomes smaller, resulting in an increase in the difference $(V_2-V_1)$. The magnitude of the difference $(V_2-V_1)$ is thus dependent on the field strength.

If the temperature rises from T to $T+dT$, the output voltage of both sensors increases by a value dV. The output voltage of Hall effect sensor 27 at the elevated temperature is therefore $V_1+dV$, while the output voltage of Hall effect sensor 29 is $V_2+dV$. If the output voltage of Hall effect sensor 27 ($V_1+dV$) is subtracted from the output voltage of Hall effect sensor 29 ($V_2+dV$), it will be seen that the dV's cancel, such that the difference between voltages sensed by Hall effect sensors 27 and 29 once again equals ($V_2-V_1$), the same value that it had at the original temperature T. It can thus be seen that the difference ($V_2-V_1$) of the output voltages of Hall effect sensors 27 and 29 remains constant with changes in temperature, varying only with changes in the magnetic field B. By using such dual Hall effect sensors, the position of piston 35 can be accurately determined over a wide temperature range.

Referring once again to FIGS. 1 through 5, Hall effect sensors 27 and 29 can be arranged back to back as shown, or may be arranged side by side or apart from each other such that one sensor is location 27A of FIG. 3 while the second sensor is at location 27.

In the preferred embodiment, permanent magnet 25 and Hall effect sensors 27 and 29 are mounted within a plastic housing 31 that can be attached to the outside of hydraulic or pneumatic cylinders having a variety of diameters by means of hose clamp 37, mounting arm 43, and mounting bracket 39. As best illustrated in FIGS. 2 and 3, cylindrical mounting arm 43 is rigidly attached to hose clamp 37, preferably by welding. Hose clamp 37 is then mounted around cylinder 33. Mounting bracket 39 has a tapered cut out 45, which, when mounting bracket 39 is attached to sensor housing 31, tightly clamps onto mounting arm 43 by tightening of hex head bolts 41. After hose clamp 37 has been tightened around cylinder 33, the lateral position of sensor housing 31 can be adjusted by loosening bolts 41 and sliding sensor housing 31 one way or the other along mounting arm 43. This allows fine positioning of the position sensor.

It will be noted that the sensor package comprising sensor housing 31 and mounting bracket 39 in the embodiment illustrated in FIG. 3 are shaped so as to contact cylinder 33 at only two locations, indicated by items 47 and 49. The same sensor package can therefore be mounted on cylinders having widely different diameters. It has been found that the preferred embodiment will operate on very small actuators to very large actuators without any adjustment or changes being required in the sensor, a very substantial marketing advantage, particularly in light of the fact that the sensor is usable with standard actuators already in the field.

Figures 8, 8A:
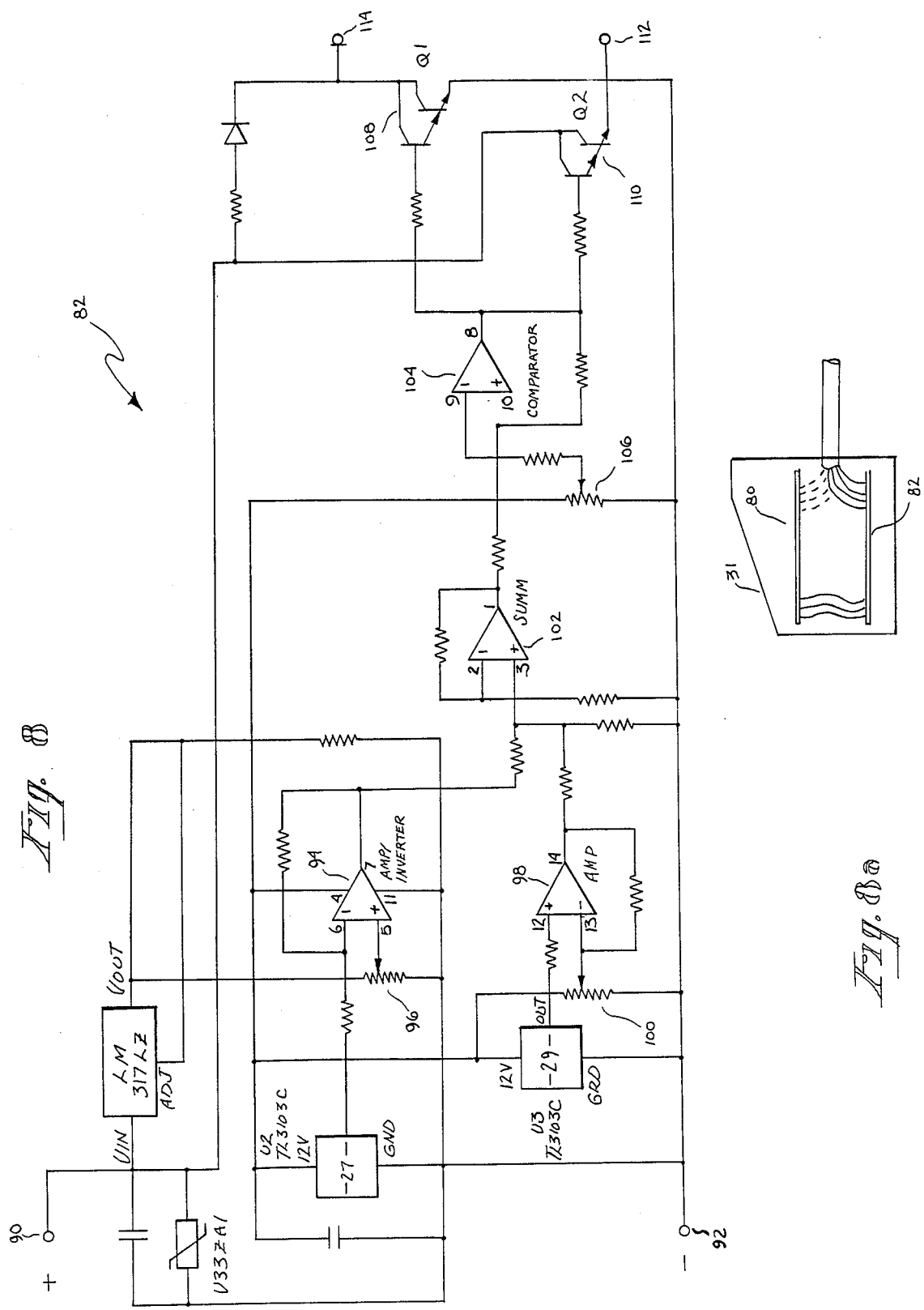
FIG. 8 is a schematic of one embodiment of a logic board used with the present invention.
FIG. 8a is a front view of the sensor illustrating the placement of the AC and DC circuit boards.
Figure 9:
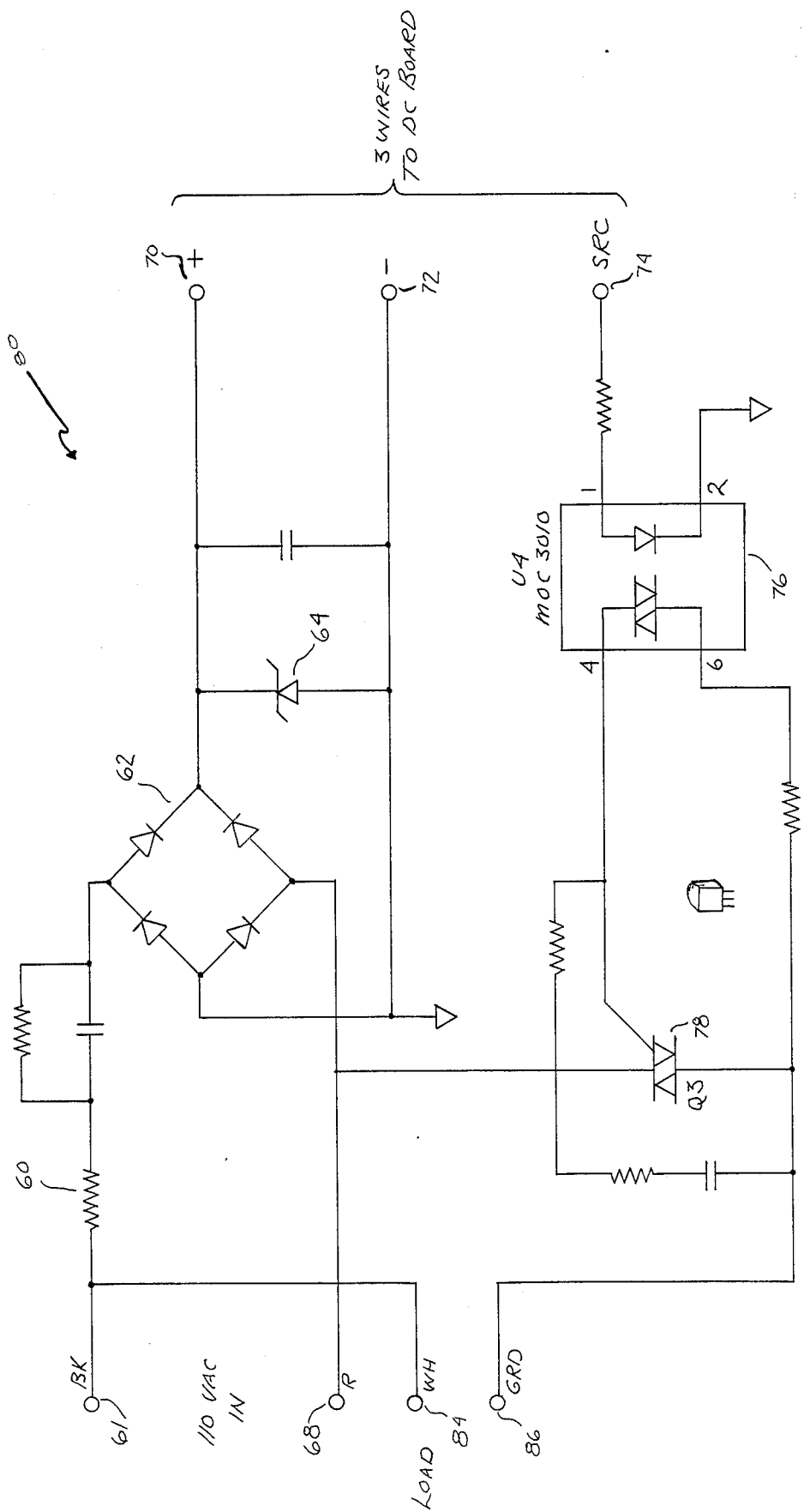
FIG. 9 is a schematic illustrating one embodiment of a power supply/output switching board used with the present invention.

Referring next to FIGS. 8 and 9, these figures illustrate one embodiment of the supporting circuitry used in conjunction with the position sensor of the prevent invention. In the preferred embodiment, the supporting circuitry is mounted on two small circuit boards 80 and 82 which may be mounted in housing 31 together with permanent magnet 25 and Hall effect sensors 27 and 29, as shown in FIGS. 1-5, and 8a. Circuit board 80 is designated the "AC board". As illustrated in FIG. 9, it contains a first power supply section for providing a nominal 12 volt power supply to the Hall effect sensors 27 and 29, and a second output power switching section for providing power to an external load. The power supply section is a simple circuit comprising a current limiting resistor 60, a bridge rectifier circuit 62, and a Zener diode 64. Resistor 60 is of sufficient size such that no substantial current flows through the bridge rectifier 62 even in the event that output terminals 70 and 72 of the power supply are shorted out. The output voltage at terminal 70 and 72 is maintained at a nominal 12 volts by zener diode 64. Output terminals 70 and 72 are connected to the power input terminals 90, 92 of "DC board" 82 which is illustrated in FIG. 8.

DC board 82 comprises a summation section for obtaining the difference between the voltage outputs of Hall effect sensors 27 and 29 (to produce the temperature compensated position sensing capabilities described above), and a switching section for turning on an external load when the summed voltage indicates that the piston has reached its intended position. Power is supplied to DC circuit board 82 via terminals 90 and 92. If the position sensor is used with an AC power source, terminals 90 and 92 are connected to output terminals 70 and 72 of AC circuit board 80. If a DC power source is used, terminals 90 and 92 may be connected directly to that power source.

The summing section of DC circuit board 82 operates as follows. The output of Hall effect sensor 27 is connected to the inverting input of operational amplifier 94, by which the output signal gets inverted and amplified. The gain of amplifier 94 can be adjusted by means of potentiometer 96. The output of Hall effect sensor 29 is connected to the non-inverting input of a similar operational amplifier 98, whose gain can be adjusted by potentiometer 100. The outputs of amplifiers 94 and 98 are fed into the non-inverting input of summing amplifier 102. The output of summing amplifier 102, which corresponds to the difference between the voltage outputs of Hall effect sensors 27 and 29, respectively, is fed into comparator 104, where it is compared to a reference voltage whose level can be adjusted by means of potentiometer 106. The level of the reference voltage is preferably adjusted to correspond to the magnitude of the signal provided by summing amplifier 102 when the piston arrives at its intended position. The output of comparator 104 is connected to switching transistors 108 and 110. When the output of comparator 104 goes high, indicating that the piston has reached its intended position, switching transistors 108 and 110 are turned on. Switching transistor 108, when turned on, connects negative power input terminal 92 to output terminal 114. Switching transistor 110, on the other hand, connects positive power input terminal 90 to positive power output terminal 112.

If the external load whose operation is being controlled by the present invention requires a DC power source, terminals 112 and 114 may be connected directly to that load. If, on the other hand, the load requires an AC power source, positive power output terminal 112 is connected to power input terminal 74 of the power output switching section of AC board 80. Referring once again to FIG. 9, the output power switching section of AC board 80 comprises a power input terminal 74, an optocoupler 76, and a solid state switch 78. When switching transistor 110 is turned on and a voltage is supplied to power input terminal 74, optocoupler 76 turns on solid state switch 78, which in turn connects AC input terminal 68 to load output terminal 86. Since load output terminal 84 is already connected to AC input terminal 66, AC line power is thereby supplied to the load.

In the preferred embodiment the Hall effect sensors comprise Texas Instruments TL3103C Hall effect sensor units which are contained in a flat rectangular package having three leads: a power supply lead, a ground lead, and a voltage output lead. This sensor senses the field component perpendicular to its flat faces.

Accordingly, a novel temperature compensated position sensor has been disclosed. The invention provides a degree of accuracy and versatility in position sensing that was not available in the prior art. Although specific details are described herein, it will be understood that various changes can be made in the materials, details, arrangements and proportions in the various elements of the present invention without departing from the scope of the invention. For example, although the invention has been described primarily with respect to use with hydraulic and pneumatic actuators, it will be understood that the invention may be used for proximity sensing in other applications as well. For instance, the invention might be used to count parts passing on a conveyor belt or to provide a warning signal if a parts feeder for an automatic assembly machine is empty or not feeding parts. If the object whose position is desired to be sensed itself produces a magnetic field, the dual Hall effect sensors can be used without an additional permanent magnet. The Hall effect sensors used in the present invention need not be placed directly adjacent to each other, but may be spaced apart. Instead of being used for discreet switching, the output of the Hall effect sensors can be coupled to a voltage metering circuit such that the instantaneous positions of a piston or other object can be measured. The permanent magnet and the Hall effect sensors can have a variety of physical dimensions and configurations, and can be arranged in various positions and orientations with respect to each other. Thus, while the preferred embodiment of the invention has been disclosed and described, it will be understood by those skilled in the art that various changes in form and detail as well as application may be made to the invention without departing from the spirit and scope thereof.

I claim:

1. A proximity sensor for providing a signal indicative of the separation between an object having magnetic characteristics and the proximity sensor within a predetermined separation comprising:
   a permanent magnet means having north and south magnetic poles disposed within said proximity sensor for providing a magnetic field having increasing linkage with the object to be sensed as said object approaches and moves within said predetermined separation from a remote position;
   first and second Hall effect sensor means disposed within said proximity sensor in the magnetic field formed between said permanent magnet and said object to be sensed when at said predetermined separation, said first and second Hall effect sensor means being positioned such that the relative magnetic field sensed by said first Hall effect sensor means is opposite in polarity to the relative magnetic field sensed by said second Hall effect sensor means, each of said first and second Hall effect sensor means having first and second input leads and an output lead, and being a means for providing an electrical signal on said output lead dependent on the magnitude and direction of the relative magnetic field sensed by said Hall effect sensor means; and
   summing and compound means coupled to said output lead of each of said first and second Hall effect sensor means for providing a net electrical signal whose magnitude corresponds to the difference between said electrical signals provided by said first and second Hall effect sensor means;
   whereby the magnitude of said net signal is dependent on the strength of the magnetic field sensed by said first and second Hall effect sensor means but is independent of the temperature of said proximity sensor.

2. The proximity sensor of claim 1 wherein said permanent magnet means has a major magnetic axis and at least one of said Hall effect sensor means is disposed along said major magnetic axis.

3. The proximity sensor of claim 1 wherein said permanent magnet means has a major magnetic axis and at least one of said Hall effect sensor means is disposed to one side of said major magnetic axis.

4. The proximity sensor of claim 1 wherein said first and second Hall effect sensor means are disposed immediately adjacent to one another.

5. The proximity sensor of claim 1 wherein said electrical signals provided by said first and second Hall effect sensor means comprise voltage signals.

6. The proximity sensor of claim 1 further comprising indicator means for indicating the magnitude of said net signal.

7. Sensor apparatus for use with an actuator having a piston with magnetic properties within a non-magnetic cylinder for sensing the arrival of the piston within a predetermined axial separation from the sensor comprising:
   a permanent magnet means disposed adjacent the outer surface of said cylinder adjacent said predetermined axial separation for defining, together with said piston, a magnetic circuit having decreasing reluctance as the piston moves through said predetermined axial separation from a position distinct from said sensor;
   first and second Hall effect sensor means disposed within said magnetic circuit for sensing the strength of the magnetic field therein and providing an electrical signal in response thereto, each of said first and second Hall effect sensor means having first and second input leads and an output lead, and being a means for providing an electrical signal on said output lead dependent on the magnitude and direction of the relative magnetic field sensed by said Hall effect sensor means, said first and second Hall effect sensor means being positioned such that the relative magnetic field sensed by said first Hall effect sensor means is opposite in polarity to the relative magnetic field sensed by said second Hall effect sensor means; and
   summing and comparing means coupled to said first and second Hall effect sensor means for providing a net electrical signal whose magnitude corresponds to the net difference between said electrical signals provided by said first and second Hall effect sensor means;
   whereby the magnitude of said net signal is dependent on the strength of the magnetic field sensed by said first and second Hall effect sensor means but is independent of the temperature of said proximity sensor.

8. The sensor of claim 7 wherein at least one of said first and second Hall effect sensor means is disposed between said permanent magnet means and said outer surface of said cylinder.

9. The sensor of claim 7 wherein at least one of said first and second Hall effect sensor means is disposed adjacent the outer surface of said cylinder adjacent said permanent magnet means.

10. The sensor of claim 7 wherein said first and second Hall effect sensor means are disposed immediately adjacent to one another.

11. The sensor of claim 7 wherein said electrical signals provided by said first and second Hall effect sensor means comprise voltage signals.

12. A temperature compensated magnetic field sensing device comprising:

first and second Hall effect sensor means disposed adjacent to each other for sensing the strength of a magnetic field and providing an electrical signal in response thereto; said first and second Hall effect sensor means being positioned such that the relative magnetic field sensed by said first Hall effect sensor means is opposite in polarity to the relative magnetic field sensed by said second Hall effect sensor means, each of said first and second Hall effect sensor means having first and second input leads on an output lead, and being a means for providing an electrical signal on said output lead dependent on the magnitude and direction of the relative magnetic field sensed by said Hall effect sensor means;

summing and comparing means coupled to said output lead of each of said first and second Hall effect sensor means for providing a net electrical signal whose magnitude corresponds to the difference between said electrical signals provided by said first and second Hall effect sensor means;

whereby the magnitude of said net signal is dependent on the strength of the magnetic field sensed by said first and second Hall effect sensor means but is independent of the temperature of said first and second Hall effect sensor means.

13. A proximity sensor for providing a signal indicative of the separation between an object having magnetic characteristics and the proximity sensor within a predetermined separation comprising:

a permanent magnet means having north and south magnetic poles disposed within said proximity sensor for providing a magnetic field having increasing linkage with the object to be sensed as said object approaches and moves within said predetermined separation from a remote position;

first and second Hall effect sensor means disposed within said proximity sensor in the magnetic field formed between said permanent magnet and said object to be sensed when at said predetermined separation, said first and second Hall effect sensor means being positioned such that the relative magnetic field sensed by said first Hall effect sensor means is opposite in polarity to the relative magnetic field sensed by said second Hall effect sensor means; each of said first and second Hall effect sensor means providing a voltage signal dependent on the magnitude of the relative magnetic field sensed by said Hall effect sensor means; and summing means coupled to said first and second Hall effect sensor means for providing a net electrical signal whose magnitude corresponds to the difference between said electrical signals provided by said first and second Hall effect sensor means, said summary means having;

first amplifier means coupled to said first Hall effect sensor means for amplifying said voltage signal provided by said first Hall effect sensor means and providing a first amplified voltage signal;

inverter means coupled to said second Hall effect sensor means for inverting and amplifying said voltage signal generated by said second Hall effect sensor means and providing a second, inverted, amplified voltage signal;

second amplifier means coupled to said first amplifier means and said inverter means for adding together said first amplified voltage signal an second inverted amplified voltage signal to provide said net voltage signal;

whereby the magnitude of said net signal is dependent on the strength of the magnetic field sensed by said first and second Hall effect sensor means but is independent of the temperature of said proximity sensor.

14. The proximity sensor of claim 13 further comprising comparator means coupled to said second amplifier means for comparing said net voltage signal to a predetermined reference voltage and providing a control signal indicating whether or not said net voltage signal is greater than or equal to said reference voltage.

15. The proximity sensor of claim 14 wherein said predetermined reference voltage corresponds to the magnitude of said net voltage signal when said object arrives at a predetermined position within said predetermined separation.

16. The proximity sensor of claim 14 further comprising switching means coupled to said comparator means for controlling the operation of an external device dependent on the position of said object with respect to said proximity sensor.

17. Sensor apparatus for use with an actuator having a piston with magnetic properties within a non-magnetic cylinder, for sensing the arrival of the piston within a predetermined axial separation from the sensor comprising:

a permanent magnet means disposed adjacent the outer surface of said cylinder adjacent said predetermined axial separation for defining, together with said piston, a magnetic circuit having decreasing reluctance as the piston moves through said predetermined axial separation from a position distinct from said sensor;

first and second Hall effect sensor means disposed within said magnetic circuit for sensing the strength of the magnetic field therein and providing an electrical signal in response thereto; and first and second Hall effect sensor means being positioned such that the relative magnetic field sensed by said first Hall effect sensor means is opposite in polarity to the relative magnetic field sensed by said second Hall effect sensor means; and summing means coupled to said first and second Hall effect sensor means for providing a net electrical signal whose magnitude corresponds to the net difference between said electrical signals provided by said first and second Hall effect sensor means, said summing means having;

first amplifier means coupled to said first Hall effect sensor means for amplifying said voltage signal provided by said first Hall effect sensor means and providing a first amplified voltage signal;

inverter means coupled to said second Hall effect sensor means for inverting and amplifying said voltage signal provided by said second Hall effect sensor means and providing a second, inverted, amplified voltage signal;

second amplifier means coupled to said first amplifier means and said inverter means or adding together said first amplified voltage signal and said second, inverted, amplified voltage signal to provide said net voltage signal;

whereby the magnitude of said net signal is dependent on the strength of the magnetic field sensed by said first and second Hall effect sensor means but is independent of the temperature of said proximity sensor.

18. The sensor of claim 17 further comprising comparator means coupled to said second amplifier means for comparing said net voltage signal to a predetermined reference voltage and providing a control signal indicating whether or not said voltage signal is greater than or equal to said reference voltage.

19. The sensor of claim 18 wherein said predetermined reference voltage corresponds to the magnitude of said net voltage signal when said piston arrives at a predetermined position within said predetermined separation.

20. The proximity sensor of claim 18 further comprising switching means coupled to said comparator means for controlling the operation of an external device dependent on the position of said piston within said predetermined separation.

* * * * *